United States Patent
Lee

(10) Patent No.: US 8,478,956 B2
(45) Date of Patent: Jul. 2, 2013

(54) COMPUTING SYSTEM AND METHOD CONTROLLING MEMORY OF COMPUTING SYSTEM

(75) Inventor: Jae Don Lee, Paju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 226 days.

(21) Appl. No.: 12/923,868

(22) Filed: Oct. 12, 2010

(65) Prior Publication Data
US 2011/0119457 A1     May 19, 2011

(30) Foreign Application Priority Data
Nov. 13, 2009   (KR) .................. 10-2009-0109633

(51) Int. Cl.
*G06F 12/00*     (2006.01)

(52) U.S. Cl.
USPC ............ 711/162; 711/154; 711/161; 711/165

(58) Field of Classification Search
USPC .................................. 711/154, 161–162, 165
See application file for complete search history.

(56) References Cited

U.S. PATENT DOCUMENTS

| | | | |
|---|---|---|---|
| 6,298,422 B1 | 10/2001 | Spilo et al. | |
| 8,200,637 B1 * | 6/2012 | Stringham | 707/670 |
| 2010/0115529 A1 * | 5/2010 | Im et al. | 718/107 |

FOREIGN PATENT DOCUMENTS

| | | |
|---|---|---|
| JP | H09-167114 | 6/1997 |
| JP | 2000-122880 | 4/2000 |
| JP | 2005-071141 | 3/2005 |
| JP | 2008-210038 | 9/2008 |
| KR | 10-2005-0014636 | 2/2005 |
| KR | 10-2008-0054324 | 6/2008 |
| KR | 10-2008-0097582 | 11/2008 |

* cited by examiner

*Primary Examiner* — Jasmine Song
(74) *Attorney, Agent, or Firm* — Staas & Halsey LLP

(57) ABSTRACT

Provided is a computing system and method. The computing system may back up, based on an overlay scheme, a task of an internal memory in an external memory, and the task may be restored to the internal memory from the external memory. The computing system may include a first memory to store data associated with a first task processed in a processor, as a first data structure, a second memory to store backup data of the data associated with the first task, and a memory controller to copy, to the second memory, data other than data previously backed up in the second memory among the data associated with the first task, when the data associated with the first task is backed up in the second memory to process a second task in the processor.

19 Claims, 8 Drawing Sheets

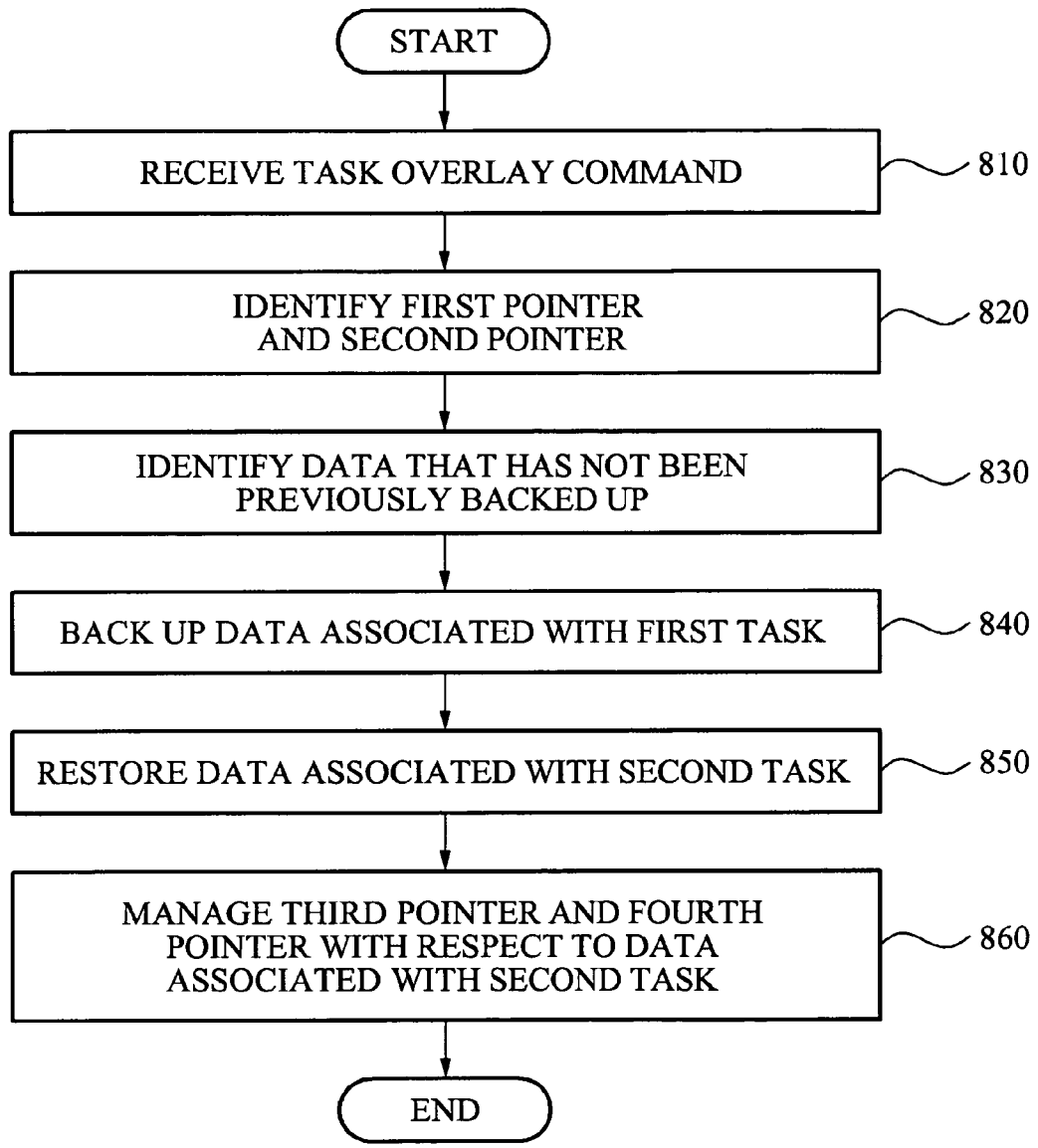

COMPUTING SYSTEM AND METHOD CONTROLLING MEMORY OF COMPUTING SYSTEM

CROSS-REFERENCE TO RELATED APPLICATIONS

This application claims the benefit of Korean Patent Application No. 10-2009-0109633, filed on Nov. 13, 2009, in the Korean Intellectual Property Office, the disclosure of which is incorporated herein by reference.

BACKGROUND

1. Field

Example embodiments relate to a memory management method that is related to a computing system having a hierarchical memory structure, and more particularly, to a memory management method that increases an efficiency of a task backup or a task restoration between an internal memory and an external memory in the hierarchical memory structure.

2. Description of the Related Art

Generally, a computer system may have a hierarchical memory arrangement structure.

In the hierarchical memory arrangement structure, a memory that is close to a processor, such as a register, a cache, and the like, may have a high access speed. Such memory may be relatively expensive, and may have a small capacity. The memory may be arranged inside the processor, and may be referred to as an internal memory.

A memory that is physically located outside of the processor, such as a random access memory (RAM) i.e., a main memory, may have a relatively low access speed. However, such memory is relatively inexpensive and may have a relatively large capacity. The large capacity memory may be arranged outside the processor, and may be referred to as an external memory.

In the computing system having the hierarchical memory arrangement structure, as a size of the internal memory is increased and utilized, a calculation speed may increase, however, a cost for the system may also increase. Accordingly, there is a desire for a method of effectively using the relatively small internal memory.

Recently, an embedded system includes a scratch pad memory inside the processor to process data, and the scratch pad memory is an internal memory having a high operational speed.

To effectively use the scratch pad memory, embedded systems may use an overlay scheme that may apply the scratch pad memory to a plurality of tasks, as opposed to using a virtual memory scheme that may use a portion of the external memory together with the internal memory.

SUMMARY

Example embodiments provide a memory management method and computing system that effectively manages a stack area of a task when an overlay scheme is used to share a relatively small internal memory.

Another aspect of example embodiments provides a memory management method and a computing system that minimizes a copy overhead when a task of an internal memory is backed up in an external memory and the task is restored to the internal memory from the external memory, to use an overlay scheme.

The foregoing and/or other aspects are achieved by providing a computing system, the computing system including a first memory to store data associated with a first task processed in a processor, as a first data structure, a second memory to store backup data of the data associated with the first task, and a memory controller to copy, to the second memory, data other than data previously backed up in the second memory among the data associated with the first task, when the data associated with the first task is backed up in the second memory to process a second task in the processor.

The first memory may be an internal memory of the processor, for example, a scratch pad memory, and the second memory may be an external memory of the processor.

The first data structure may be a stack.

The memory controller may perform storing a first pointer and a second pointer when the first task is processed in the processor, the first pointer pointing to a top address of data in the stack and the second pointer pointing to a bottom of a portion of data that has not been previously backed up in the second memory among the data in the stack, and copying, to the second memory, data stored between an address corresponding to the first pointer and an address corresponding to the second pointer when the data associated with the first task is backed up in the second memory, to process the second task in the processor.

The memory controller may store the second pointer in a task control block (TCB) of the computing system and manages the second pointer.

The memory controller may store the second pointer in a general-purpose register of the computing system and manages the second pointer.

The computing system may further include a dedicated register to store the second pointer, and the memory controller may store the second pointer in the dedicated register and manages the second pointer.

The foregoing and/or other aspects are achieved by providing a computing system, the computing system including a first memory having a high-speed data access and assisting a task process of a processor, a second memory having a data access speed lower than the first memory, and backing up data of the first memory, and a memory controller to copy, to the second memory, data other than data previously backed up in the second memory from among data associated with a first task stored in the first memory, based on an overlay scheme, when the first task processed in the processor is changed into a second task.

The foregoing and/or other aspects are achieved by providing a method of managing a memory, the method including receiving a task overlay command commanding to change a first task processed in a processor into a second task, identifying data other than data previously backed up in a second memory that is backing up data of a first memory, from among data associated with the first task stored in the first memory that is assisting a task process of the processor, and copying the identified data to the second memory to back up the data associated with the first task in the second memory.

According to example embodiments, a copy overhead may be minimized when a task of an internal memory is backed up in an external memory and the task is restored to the internal memory from the external memory, for an overlay scheme.

Therefore, a hierarchical memory structure may be embodied in a computing system with a small cost, and efficiency in managing a memory may be increased. As a result, speed of processing a task may be maximized.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 is a flowchart illustrating a memory management method according to example embodiments.

DETAILED DESCRIPTION

Figure 1:
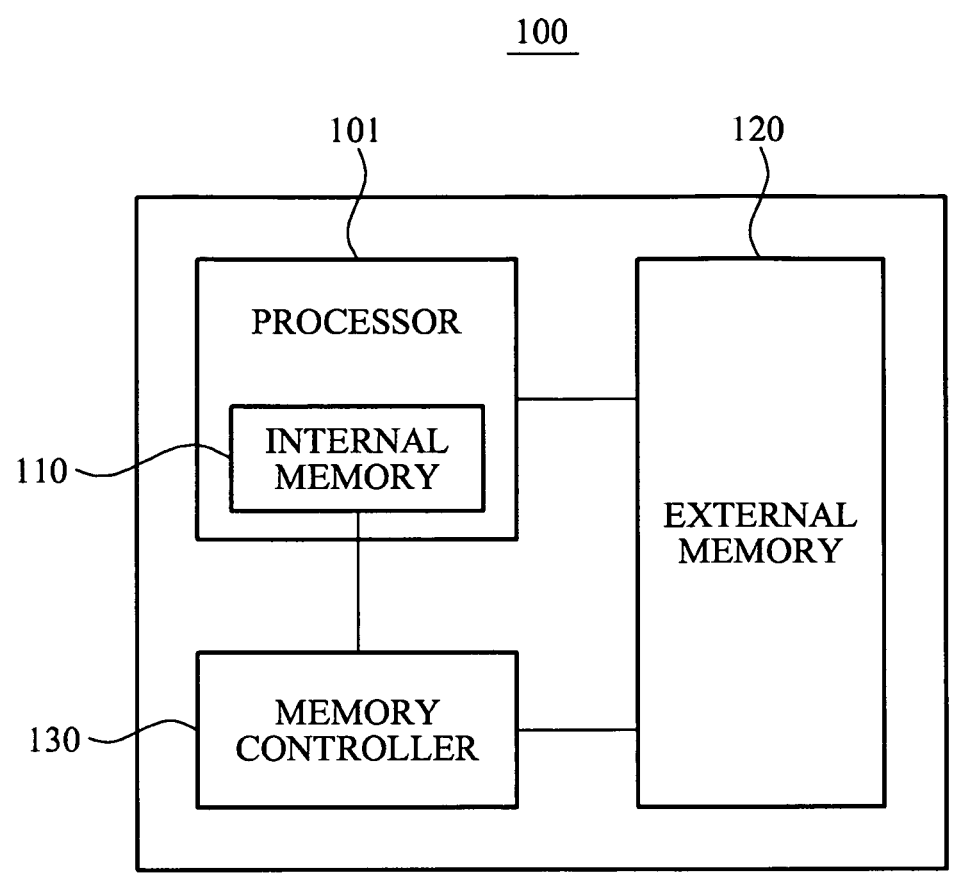
FIG. 1 is a diagram illustrating a computing system according to example embodiments.

Reference will now be made in detail to the embodiments, examples of which are illustrated in the accompanying drawings, wherein like reference numerals refer to like elements throughout. The embodiments are described below to explain the present disclosure by referring to the figures.

FIG. 1 illustrates a computing system 100 according to example embodiments.

The computing system 100 may be a desktop computer, a laptop computer, an embedded system, and the like. In addition to the examples, the computing system 100 may be any device that may electrically perform a calculation.

The computing system 100 may process tasks according to a predetermined schedule and the process may be performed by a processor 101, such as a central processing unit (CPU).

A memory storing data associated with a task may be used for the calculation of the processor 101. When the memory has a high access speed, the memory may be expensive.

Accordingly, a general computing system may select a hierarchical memory structure, and may arrange, in a location physically close to the processor 101, a small capacity memory having a high data access speed, and may arrange, in a location outside of the processor 101, a large capacity memory having a low data access speed.

A memory having a high data access speed, such as a register, a cache, and the like, may be utilized as an internal memory 110 of the processor 101. A high capacity memory that may be inexpensive and may have a low data access speed may be utilized as an external memory 120.

In a case of the embedded system that may be utilized as a variety of information appliances, the internal memory 101 may be a scratch pad memory.

Hereinafter, the internal memory 110 may be referred to as a first memory and the external memory 120 may be referred to as a second memory.

In a multi-tasking environment, processing the first task may be stopped in the middle of the processing to start a process of processing the second task, as per an interrupt request inputted to the processor 101 or a predetermined task schedule.

According to example embodiments, when a task processed in the processor 101 is changed, the computing system 100 may use an overlay scheme. According to the overlay scheme, when the task is changed, data that is associated with the first task and is stored in the internal memory 110 may be backed up to the external memory 120, and data that is associated with the second task and that is stored in the external memory 120 may be restored to the internal memory 110.

In this case, an overall calculation speed may increase by decreasing a copy overhead to copy to the external memory 120 the data that is associated with the first task and is stored in the internal memory 110.

According to example embodiments, when a task change command commanding a change to the second task is received for an arbitrary reason while the first task is processed in the processor 101, a memory controller 130 may back up data other than data backed up in the external memory 120 that has not been changed. In other words, the memory controller 130 may back up, in the external memory 120, data that has not been backed up in the external memory 120 or data having invalid backup data because the data is newly changed.

The data associated with the first task may be stored in the internal memory 110 as a stack structure.

A data structure may conform to a Last In First Out policy where data that is pushed last to a stack is popped first. Data that is most recently pushed may be referred to as a stack top and data that is pushed earliest may be referred to as a stack bottom.

The stack top may be indicated by a stack pointer (SP).

According to example embodiments, the memory controller 130 may restore, in the internal memory 110, the data that is associated with the first task and is backed up in the external memory 120 as the stack structure, before processing the first task that is being processed in the processor 101. The restored data may also be stored in the internal memory 110 as the stack structure.

When the first task is processed in the processor 101, a portion of data may be popped from the stack or new data may be pushed onto the stack.

Accordingly, at least a portion of the backup data related to the first task remaining in one area of the external memory 120 during a period of time from the restoration to a current time may be invalid data.

According to example embodiments, the memory controller 130 may store and manage a stack bottom usage pointer (SBUP) in addition to the SP, while the first task is processed in the processor 101.

The SP may indicate an address of data that is most recently pushed among data in the current stack, and the SBUP may indicate an address of data highest in the stack among data that has not been popped since being restored.

Hereinafter, the SP may be referred to as a first pointer and the SBUP may be referred to as a second pointer.

When the processor 101 receives a task change command, recent data that is associated with the first task and is stored in the internal memory 110 may be backed up again in the area of the external memory 120.

In this case, according to example embodiments, the memory controller 130 may not copy all data in the stack to the external memory 120, and may copy, to the external memory 120, only data stored between an address indicated by the SP and an address indicated by the SBUP.

Data that has not been copied in the process, i.e., data stored in an area from the stack bottom to the address indicated by the SBUP, may not need to be copied again since the data may be the same as the data stored in the external memory 120 during a period of time from the restoration to the current time.

Therefore, according to the example embodiments, a data copy overhead may be dramatically decreased in the overlay scheme for changing the task.

An operation of the computing system 100 will be described with reference to FIG. 2.

Figure 2:
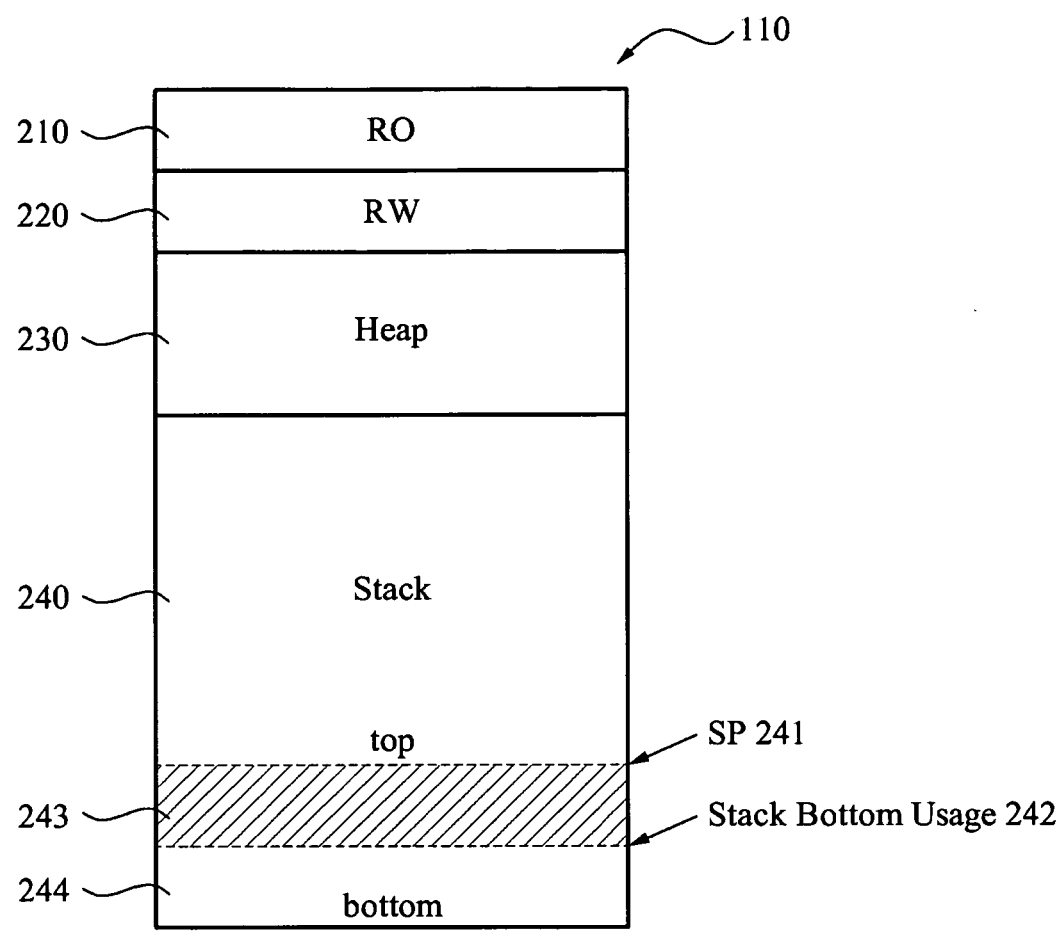
FIG. 2 is a diagram illustrating an internal memory of FIG. 1.

FIG. 2 illustrates the internal memory 110 of FIG. 1.

The internal memory 110 may include a read only (RO) area 210, a read write (RW) area 220, a heap area 230, and a stack area 240.

The RO area 210 may store data that is readable and is not writable. The RO area 210 may not be changed during a task processing process, and thus, the data may not need to be backed up when the data is backed up once in the external memory 120.

The RW area 220 may store data that is both readable and writable. Therefore, the RW area 220 may be changed during the task processing process. As a result, data previously backed up in the external memory 120 may be invalid data. Therefore, when the data is backed up from the internal memory 110 to the external memory 120 for exchanging the task, the RW area may need to be copied again.

The heap area 230 may be an area dynamically allocated to a user, and the heap area may need to be copied when the task is changed.

According to example embodiments, when a task is processed in the processor 101, the memory controller 130 may store and manage a SP 241 indicating an address of data that is most recently pushed in the stack area 240 and a SBUP 242 indicating an address of oldest data among data that has never been popped.

When the data is popped from the stack area 240, the memory controller 130 may decrease the SP 241 by "1", and when the decreasing SP 241 is less than the SBUP 242, the SBUP 242 may be updated to be a same value as the new SP 241.

When the data is pushed, the memory controller 130 may increase the SP 241 by "1", and the SBUP 242 is not changed.

Therefore, data stored in an area 243 between the address indicated by the SP 241 and the address indicated by the SBUP 242 may be new data that is different from existing data backed up in the external memory 120. Data stored in an area 244 between the address indicated by the SBUP 242 and a stack bottom may be the same as the existing data backed up in the external memory 120.

According to example embodiments, when data stored in the stack area 240 of the internal memory 110 is backed up in the external memory 120 for changing the task, the data in the area 243 and 244 between the address indicated by the SP 241 and the stack bottom may not need to be backed up and only the data in the area 243 including the new data that is different from the existing data may need to be backed up in the external memory 120.

Therefore, a copy overhead with respect to the data stored in the area 244 may decrease.

Figure 3:
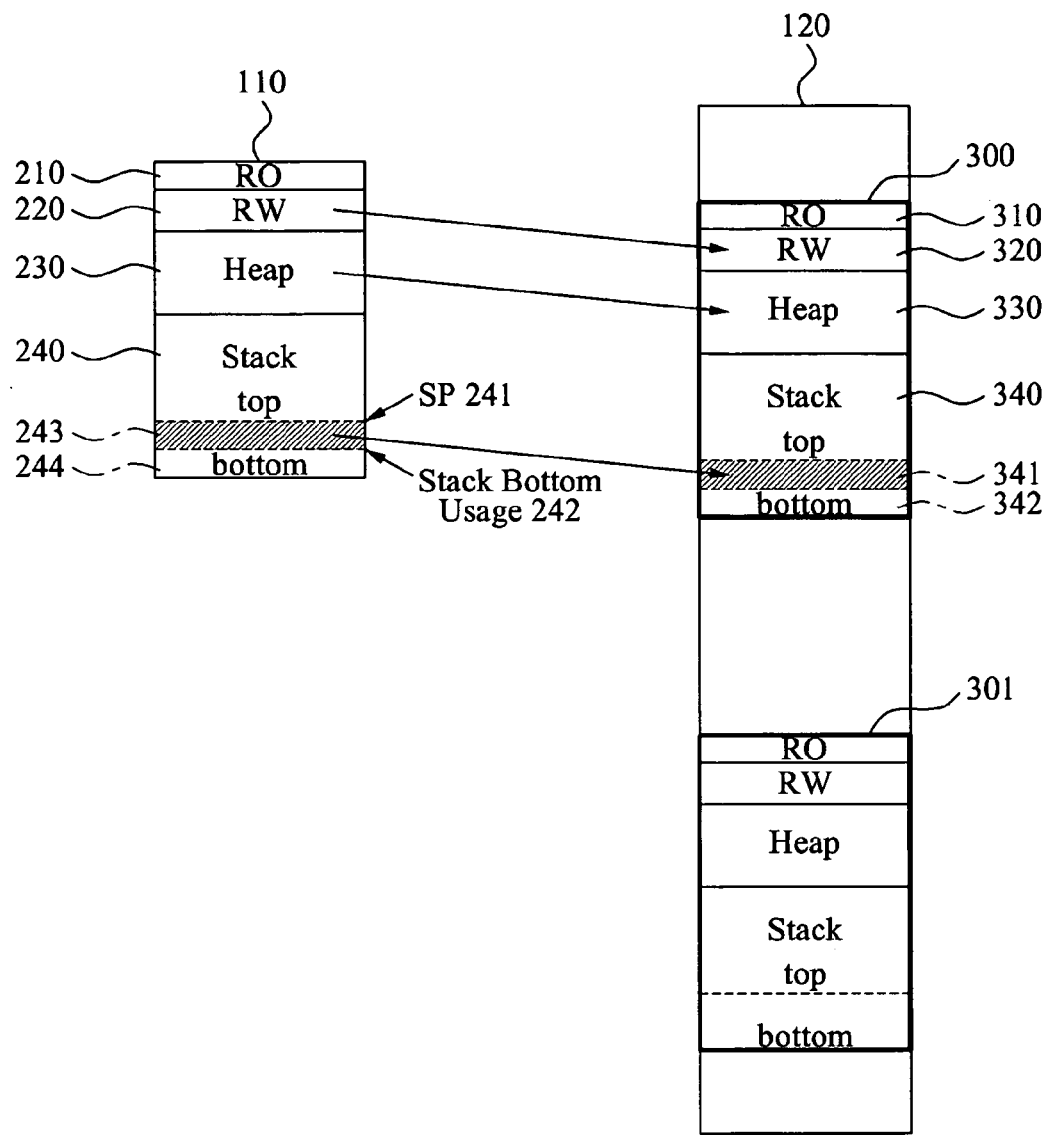
FIG. 3 is a diagram illustrating a process where a task is backed up from an internal memory to an external memory of FIG. 1.

FIG. 3 illustrates a process where a first task is backed up from the internal memory 110 to the external memory 120 of FIG. 1.

Data associated with the first task may be stored in the internal memory 110.

The internal memory 110 may include the RO area 210, the RW area 220, the heap area 230, and the stack area 240.

In this case, the memory controller 130 may store and manage the SP 241 and the SBUP 242.

The data associated with the first task has been previously backed up in a first area 300 of the external memory 120 and may be restored in the internal memory 110.

While the first task is processed by the processor 101 after the restoration, data in the RW area 220, the heap area 230, and the area 243 may be changed, and data in the RO area 210 and the area 244 may not be changed.

In this case, a command commanding to change a task to be processed in the processor 101 from the first task to a second task, and the data associated with the first task in the internal memory 110 may need to be backed up in the external memory 120.

The data in the RW area 220 may be copied to an RW area 320, the data in the heap area 230 may be copied to a heap area 330, and the data in the area 243 may be copied to an area 341.

The data of the RO area 210 may already be backed up in an RO area 310, and the data of the RO area 210 may not need to be backed up since the data of the RO area 210 may not be changed.

The data associated with the first task may be backed up from the internal memory 110 to the first area 300 of the external memory 120, and data associated with a second task may be restored in the internal memory 110 from an area 301.

Figure 4:
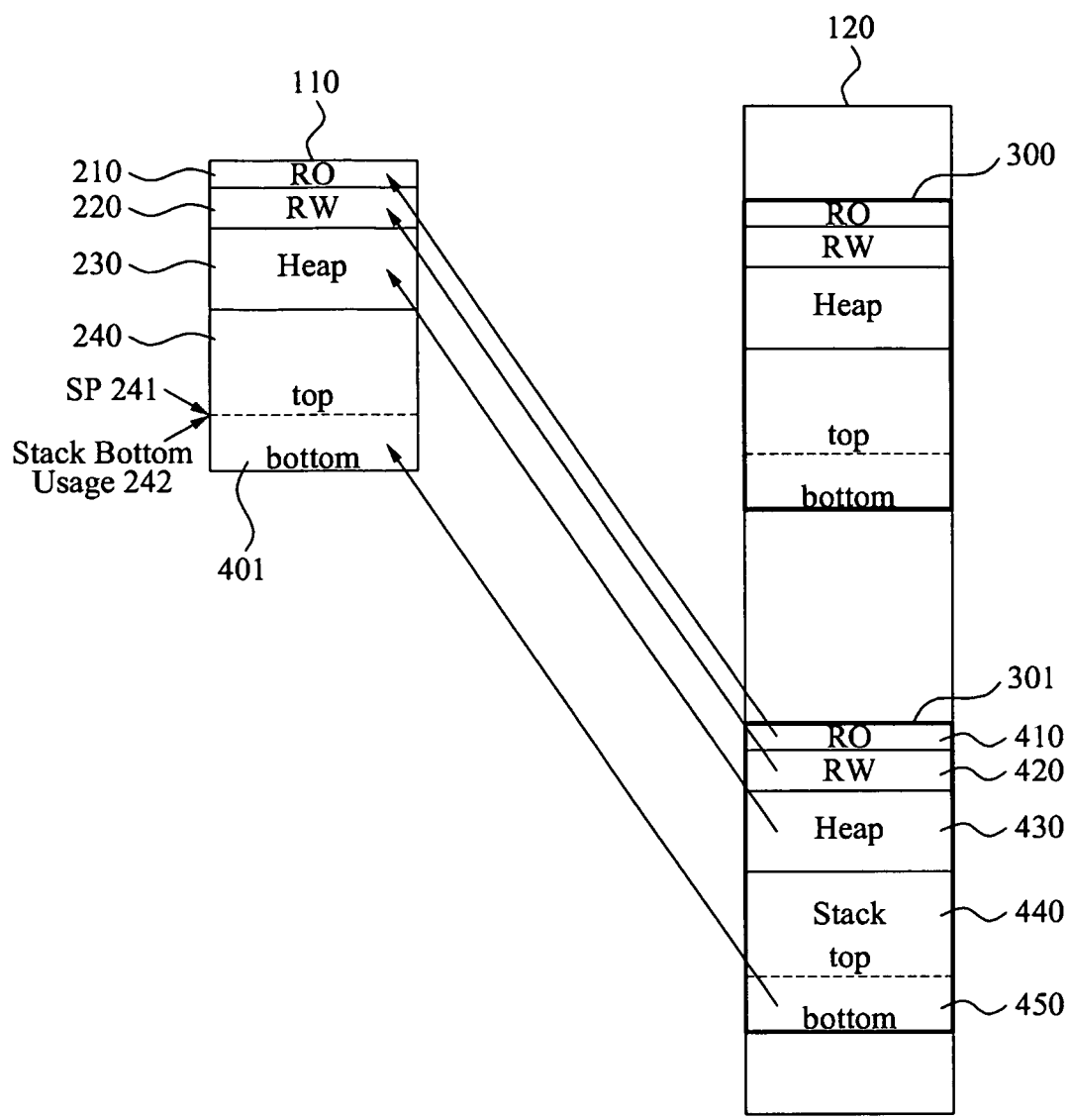
FIG. 4 is a diagram illustrating a process where a task is restored from an external memory to the internal memory of FIG. 1.

FIG. 4 illustrates a process where a second task is restored from the external memory 120 to the internal memory 110 of FIG. 1.

Data of an RO area 410 in the area 301 storing data associated with a second task may be copied to the RO area 210, data of an RW area 420 may be copied to the RW area 220, data of a heap area 430 may be copied to the heap area 230, and data of an area 450 storing data in a stack area 440 may be copied to an area 401 in the stack area 240.

In this case, an address corresponding to data to be popped first from among data in the area 401, i.e., an address of a stack top may be stored as the SP 241 and the SBUP 242.

Subsequently, when data is popped from the stack area 240, the memory controller 130 may decrement the SP 241. In this case, the SP 241 is less than the SBUP 242 and thus, the memory controller 130 may update the SBUP 242 to be the same as the decremented SP 241.

When data is pushed onto the stack area 240, the memory controller 130 may increase the SP 241. In this case, the SBUP 242 may not need to be changed.

A method where a controller stores and manages the SP 241 and the SBUP 242 will be described with reference to FIGS. 5 through 7.

Figure 5:
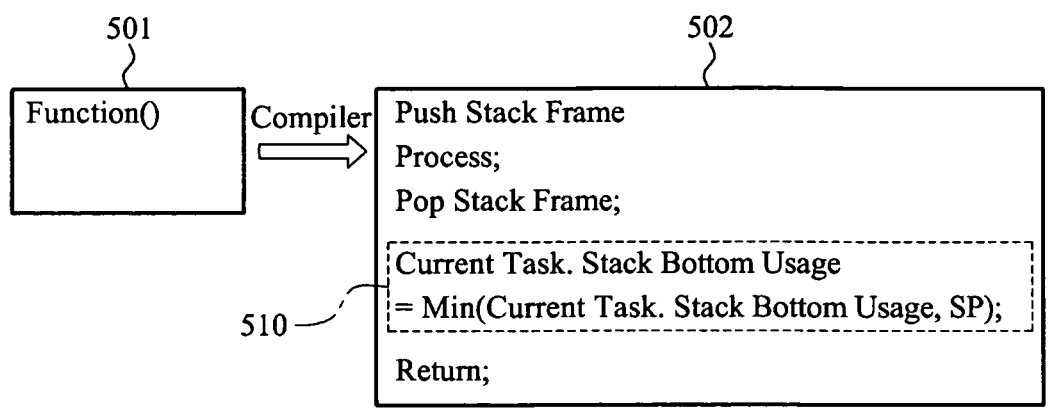
FIG. 5 is a diagram illustrating an operation of a compiler in a computing system according to example embodiments.

FIG. 5 illustrates an operation of a compiler in a computing system according to example embodiments.

When a function 501 written by a high-level language is compiled in the computing system 100, machine code 502 may be generated.

When a function is compiled in a conventional computing system, a stack frame may be pushed onto a stack and the stack frame may be popped from the stack after the function performs a calculation, and thus, machine code that returns to a previous function may be generated.

However, in a case where the function 501 is compiled in the computing system 100 according to example embodiments, when the stack frame is popped from the stack, a code 510 that stores a smaller value as one of a SBUP and a SP as a current SBUP may be added.

In this case, the computing system 100 according to example embodiments may record information associated with a stack usage area in a task control block (TCB) without changing a format of hardware, contrary to the conventional computing system.

Figure 6:
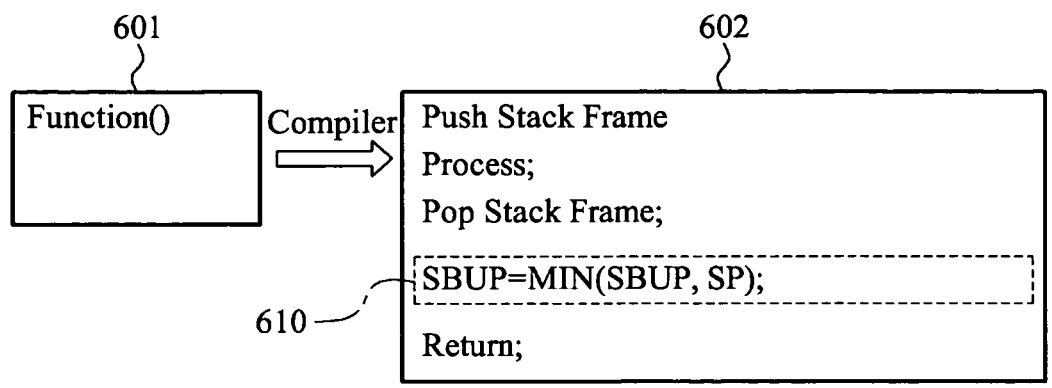
FIG. 6 is a diagram illustrating an operation of a compiler in a computing system according to example embodiments.

FIG. 6 illustrates an operation of a compiler in the computing system 100 according to example embodiments.

In a case where a function 601 is compiled similar to the example of FIG. 5, when a stack frame is popped from a stack, machine code 602 additionally including code 610 that may store the smaller of one of an SBUP and an SP as a current SBUP may be generated.

In this case, the SP and the SBUP, which are related to a stack usage area, may be stored in an allocated portion of an existing general-purpose register, and the memory controller 130 of the computing system may manage the allocated portion which is not to be used for a different purpose.

Figure 7:
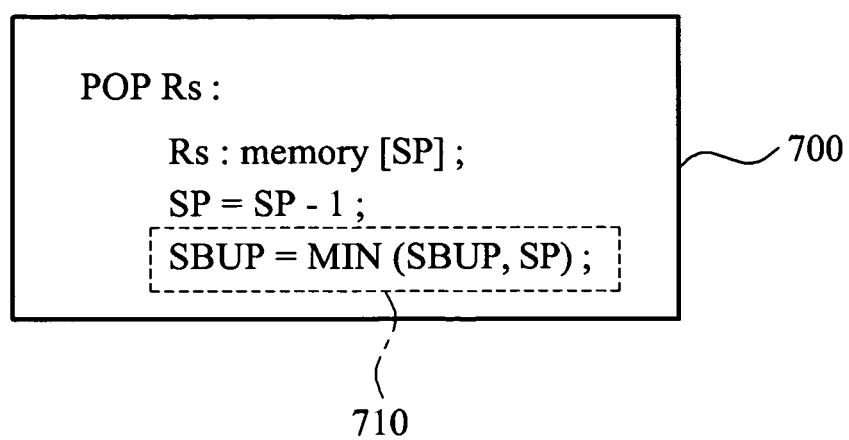
FIG. 7 is a diagram illustrating a macrocode of a stack POP in a computing system according to example embodiments.

FIG. 7 illustrates a macrocode 700 of a stack POP in the computing system 100 according to example embodiments.

The micro code 602 for a stack POP command may be corrected from general micro code. In this case, in 710, the code 610 may be added, and the code 610 may compare a current SP with a current SBUP to update the smaller of the current SP and the current SBUP as a new SBUP value whenever a stack POP command is performed.

According to example embodiments, a compiler of the computing system 100 may not be corrected.

FIG. 8 illustrates a memory management method according to example embodiments.

In operation 810, a task change command commanding to change a task to be processed in the processor 101 of FIG. 1 is received. The task change command may be based on a predetermined task schedule or may be based on an interrupt request. The task change command may be based on other reasons. The task change command may be understood as a task overlay command with respect to the internal memory 110.

In operation 820, a first pointer of a current stack, in particular, a SP, and a second pointer of the current stack, in particular, a SBUP, may be identified. In this case, example embodiments storing information associated with the SP and the SBUP have been described with reference to FIGS. 5 through 7.

In operation 830, data between an address indicated by the SP and an address adjacent to an address indicated by the SBUP may be identified as a data portion that has not been previously backed up in the external memory 120. The identified data portion may correspond to the area 243 of FIG. 3.

In operation 840, the data in the area 243 may be copied to the area 341 of the external memory 120. In this case, a process of copying data in the area 244 to the area 342 may be omitted, and thus, a copy overhead may be dramatically decreased as described with reference to FIG. 3.

When a first task is backed up in the external memory 120, data associated with a second task may be restored in operation 850. In this case, the data of the area 450 of FIG. 4 may be copied to the area 242. The process of copying has been described with reference to FIG. 4 and will be herein omitted.

While the second task is processed in the processor 101, the memory controller may manage a third pointer, namely, a SP, and a fourth pointer, namely, a SBUP, with respect to data of a stack structure associated with the second task according to example embodiments described with reference to FIGS. 5 through 7.

While the second task is processed, information associated with a stack usage area may be stored, and the information associated with the stack usage area may indicate a changed data area that is changed after the second task is previously backed up in the area 301 of the external memory 120 and is restored.

When a task change command is again received with respect to the second task, only a changed data portion is copied, and thus, a data overlay may be simply performed.

The above-described example embodiments may also be implemented through computer readable code/instructions in/on a non-transitory medium, e.g., a non-transitory computer readable medium, to control at least one processing element to implement example embodiments. The non-transitory medium can correspond to medium/media permitting the storing or transmission of the computer readable code.

The computer readable code can be recorded or transferred on a non-transitory medium in a variety of ways, with examples of the non-transitory medium including recording media, such as magnetic storage media (e.g., ROM, floppy disks, hard disks, etc.), hardware devices that are specially configured to store and perform program instructions, such as read-only memory (ROM), random access memory (RAM), flash memory, and the like and optical recording media (e.g., CD-ROMs, or DVDs), and transmission media. The media may also be a distributed network, so that the non-transitory computer readable code is stored or transferred and executed in a distributed fashion. Still further, as an example, the processing element could include a processor or a computer processor, and processing elements may be distributed or included in a single device.

In addition to the above described embodiments, example embodiments can also be implemented as hardware, e.g., at least one hardware based processing unit including at least one processor capable of implementing any above described example embodiments. The instructions may also be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter.

Although a few embodiments have been shown and described, it should be appreciated by those skilled in the art that changes may be made in these embodiments without departing from the principles and spirit of the disclosure, the scope of which is defined in the claims and their equivalents.

What is claimed is:

1. A computing system, comprising:
    a first memory to store data associated with a first task processed in a processor, as a first data structure;
    a second memory to store backup data of the data associated with the first task; and
    a memory controller to copy, to the second memory, data other than data previously backed up in the second memory among the data associated with the first task, when the data associated with the first task is backed up in the second memory to process a second task in the processor,
    wherein the data other than data previously backed up in the second memory comprises data stored between an address indicated by a first pointer and an address indicated by a second pointer.

2. The computing system of claim 1, wherein the first memory is an internal memory of the processor and the second memory is an external memory of the processor.

3. The computing system of claim 2, wherein the first memory is a scratch pad memory.

4. The computing system of claim 1, wherein the first data structure is a stack.

5. The computing system of claim 4, wherein the memory controller performs:
    storing the first pointer and the second pointer when the first task is processed in the processor, the first pointer pointing to a top address of data in the stack and the second pointer pointing to a bottom of a portion of data that has not been previously backed up in the second memory among the data in the stack.

6. The computing system of claim 5, wherein the memory controller stores the second pointer in a task control block (TCB) of the computing system and manages the second pointer.

7. The computing system of claim 5, wherein the memory controller stores the second pointer in a general-purpose register of the computing system and manages the second pointer.

8. The computing system of claim 5, further comprising:
    a dedicated register to store the second pointer,
    wherein the memory controller stores the second pointer in the dedicated register and manages the second pointer.

9. A computing system, comprising:
    a first memory having a high-speed data access and assisting a task process of a processor;
    a second memory having a data access speed lower than the first memory, and backing up data of the first memory; and
    a memory controller to copy, to the second memory, data other than data previously backed up in the second memory from among data associated with a first task stored in the first memory, based on an overlay scheme, when the first task processed in the processor is changed into a second task,
    wherein the data other than data previously backed up in the second memory comprises data stored between an address indicated by a first pointer and an address indicated by a second pointer.

10. The computing system of claim 9, wherein the first memory is a scratch pad memory.

11. The computing system of claim 9, wherein the data associated with the first task is in a stack, and is stored in one of the first memory and the second memory.

12. The computing system of claim 11, wherein the memory controller performs:
    storing the first pointer and the second pointer when the first task is processed in the processor, the first pointer pointing to a top address of data in the stack and the second pointer pointing to a bottom of a portion of data that has not been previously backed up in the second memory among the data in the stack.

13. A method of managing a memory, the method comprising:
    receiving a task overlay command commanding to change a first task processed in a processor into a second task;
    identifying data other than data previously backed up in a second memory that is backing up data of a first memory, from among data associated with the first task stored in the first memory that is assisting a task process of the processor; and
    copying the identified data to the second memory to back up the data associated with the first task in the second memory,
    wherein the identified data comprises data stored between an address indicated by a first pointer and an address indicated by a second pointer.

14. The method of claim 13, wherein the data associated with the first task is a stack and is stored in one of the first memory and the second memory.

15. The method of claim 14, wherein the identifying comprises:
    identifying the first pointer pointing to a top address of data in the stack and the second pointer pointing to a bottom of a portion of data that has not been previously backed up in the second memory, from among data in the stack.

16. The method of claim 13, further comprising:
    restoring data associated with the second task in the first memory, the data being previously backed up in the second memory as a stack; and
    storing a third pointer and the second pointer with respect to the restored data when the second task is processed, the third pointer pointing to a top address of the restored data and the second pointer pointing to a bottom of a portion of data that has not been previously backed up in the second memory.

17. At least one non-transitory computer readable recording medium comprising computer readable instructions that control at least one processor to implement the method of 13.

18. A method of managing a memory, the method comprising:
    receiving a task overlay command to change a first task processed in a processor into a second task;
    identifying data changed by the first task in a first memory since a previous backup of the first memory into a second memory; and
    copying, among the data in the first memory, only the identified changed data to the second memory to backup the data associated with the first task in the second memory,
    wherein the identifying comprises:
    identifying, in the first memory, a first pointer pointing to a top address of a portion of data that has not been previously backed up in the second memory, and a second pointer pointing to a bottom address of the portion of data.

19. The method of claim 18, wherein the first memory is a scratch pad memory, the second memory is an external memory, and the identified data is located in a stack area of the scratch pad memory.

* * * * *

UNITED STATES PATENT AND TRADEMARK OFFICE
CERTIFICATE OF CORRECTION

PATENT NO. : 8,478,956 B2  
APPLICATION NO. : 12/923868  
DATED : July 2, 2013  
INVENTOR(S) : Jae Don Lee et al.

Page 1 of 1

It is certified that error appears in the above-identified patent and that said Letters Patent is hereby corrected as shown below:

In the claims

Column 10, Line 33, In Claim 17, delete "0f 13." and insert -- of claim 13. --, therefor.

Signed and Sealed this  
Fifteenth Day of October, 2013

Teresa Stanek Rea  
*Deputy Director of the United States Patent and Trademark Office*